United States Patent [19]

Benard

[11] Patent Number: 5,794,117
[45] Date of Patent: Aug. 11, 1998

[54] CABLE TELEVISION NETWORK WITH UPSTREAM CHANNEL SPECIALIZED FOR SENDING UPSTREAM INFORMATION SIGNALS

[75] Inventor: François Benard, Belbeuf, France

[73] Assignee: U.S. Philips Corporation, New York, N.Y.

[21] Appl. No.: 615,929

[22] Filed: Mar. 14, 1996

[30] Foreign Application Priority Data

Mar. 15, 1995 [FR] France .................. 95 03014

[51] Int. Cl.$^6$ .............. H04H 1/00; H04N 7/14; H04B 10/08
[52] U.S. Cl. .............. 455/5.1; 348/12; 348/180; 359/110; 370/243
[58] Field of Search .............. 348/6, 7, 12, 13, 348/180, 192, 193; 455/3.1, 4.1, 4.2, 5.1, 6.1; 359/110, 115, 135, 137, 142, 143, 146; 370/241, 242, 243, 244, 246, 248, 250; 375/211, 213, 219, 220, 224; 340/825, 825.06, 825.07, 825.08, 825.16; H04N 1/10, 7/14, 7/173

[56] References Cited

U.S. PATENT DOCUMENTS

| 4,449,247 | 5/1984 | Waschka, Jr. ............ 359/110 |
| 4,451,916 | 5/1984 | Casper et al. ............ 359/110 |
| 5,142,690 | 8/1992 | McMullan, Jr. et al. ...... 455/6.1 |
| 5,442,472 | 8/1995 | Skrobko .................. 359/110 |
| 5,642,217 | 6/1997 | Carbone, Jr. et al. ...... 359/110 |

FOREIGN PATENT DOCUMENTS 2442208 3/1976 Germany .............. H04B 3/46

*Primary Examiner*—Mark R. Powell
*Assistant Examiner*—John W. Miller

[57] ABSTRACT

The network comprises a tree specialized in sending information signals upstream, comprising optical-fibre branches. In a junction (L5), an opto-electric conversion is performed in a receiver (RPR5, RPR6) and an electro-optical conversion in a transmitter (RPE2). In the electrical part of a junction, the transmitter of the junction (RPE2) polls the receivers of the junction (RPR5, RPR6) to receive therefrom the messages coming from downstream (5 . . . 6 . . . 5 . . . 6 . . . ), after which a message of local origin (S) is added to those coming from downstream. Although, as a result of the polling, there is no synchronism between the retransmission and the reception of the given message, a specific process makes it possible to ensure that the messages reach an upstream receiver (RPR2) in a predetermined order (S X 5 X 6 X S X 5 X 6 . . . ), which makes it possible to recognize when all the messages have been received well.

15 Claims, 2 Drawing Sheets

CABLE TELEVISION NETWORK WITH UPSTREAM CHANNEL SPECIALIZED FOR SENDING UPSTREAM INFORMATION SIGNALS

FIELD OF THE INVENTION

The present invention relates to a process for transmitting upstream messages in a cable television network which comprises a specific tree-like path for sending messsages upstream, which path comprises a plurality of branches called upstream branches, each formed by an optical fibre.

The invention also relates to a cable television network comprising a tree-like path called main path which the signals follow when they leave a transmission centre, and which comprises a plurality of branches called downstream branches, each formed by an optical fibre, and a second tree-like path called upstream path which signals follow to go back to the transmission centre, and which comprises a plurality of branches called upstream branches which are each formed by an optical fibre and run parallel with a branch of the main path.

The invention finally relates to an intermediate station called "junction", intended to be used in such a network.

BACKGROUND OF THE INVENTION

A network corresponding to the network in the opening paragraph is known from the document WO 93/05619. The network described in this document comprises a network head-end and various stations, each linked directly to the head-end. The links are made each time by a downstream optical fibre paired with an upstream optical fibre. The upstream messages modulate a high-frequency carrier.

SUMMARY OF THE INVENTION

It is an object of the invention to provide a tree-like optical fibre network which allows of the rapid return of information signals, with a minimum-sized memory in each optical receiver, without a polling from the side of the head-end station. A problem is posed because in the upstream path a junction has no means to send an acknowledgement of receipt down again, which acknowledgement permits the junction to acknowledge that it has correctly received a message coming from downstream, without passing along the downstream path, which would be hard to realize.

For this purpose, the process according to the invention is characterized in that, in a junction between an upstream branch and various downstream branches, which comprises a transmitter including a converter for producing a light signal transmitted up the upstream branch from a message sequence in the form of an electric signal and, for each downstream branch, a receiver which includes a converter which produces a message in the form of an electric signal from a light signal coming from the downstream branch, a message received from downstream and carrying a recognition code is recorded in a receiving memory, based on messages received by the receivers and a message, called local message, generated in the junction itself to be transmitted up the upstream branch, a send message sequence is determined which comprises first messages which repeat in a delayed version the messages received by the receivers and, in the end, the local message whose presence indicates that the sequence has ended, the same sequence is repeated indefinitely while the contents of the message are being updated, as required.

In a cable television network comprising at least a junction between an upstream branch and various downstream branches, such a junction comprises a receiver for each downstream branch, which includes
a converter for generating a message in the form of an electric signal from a light signal coming from the downstream branch,
and a processor having instructions to instruct the recording of this message together with a recognition code in a receiving memory, a transmitter, which includes
a processor with instructions for
determining a sequence of send messages based on digital data which represent, on the one hand, messages received by the receivers and, on the other hand, a message called local message generated in the junction itself to be transmitted up the upstream branch, which sequence comprises
firstly, messages which repeat in a delayed version the messages received by the receivers,
and finally, the local message whose presence indicates that the sequence has ended,
and for instructing the indefinite repetition of the same sequence while the contents of the message are being updated, as required,
and a converter for producing a light signal based upon the sequence of messages and transmitted up the upstream branch.

The invention is thus based on the idea of ensuring that the messages always reach an upstream receiver in a predetermined order, which permits the receiver of making certain that it has properly received all the messages.

According to a particular embodiment of the process, the receiving memories are polled periodically and a message received from downstream is recorded in the receiving memory only if the message recorded previously has been read by the transmitter.

After a certain message has been applied to the transmitter in response to a polling, and while other messages continue to arrive at the receiver in a repetitive way, with said certain message among them, said certain message is advantageously waited for to occur again without any recording being effected, and the message following said certain message is recorded, and a test is made whether the latest message received in response to the periodic polling of a receiver is a local message coming from the downstream junction, and in that case, a periodic polling of another receiver is proceeded to, in the opposite case, the same receiver is continued to be polled.

Advantageously, a message exclusively intended for the junction located immediately upstream is inserted between each of the other messages.

This makes it possible for such a message intended exclusively for the junction located immediately upstream to reach its destination more rapidly.

In a cable television network and in an intermediate station of such a network, processors have instructions for controlling the implementation of the process stated above.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
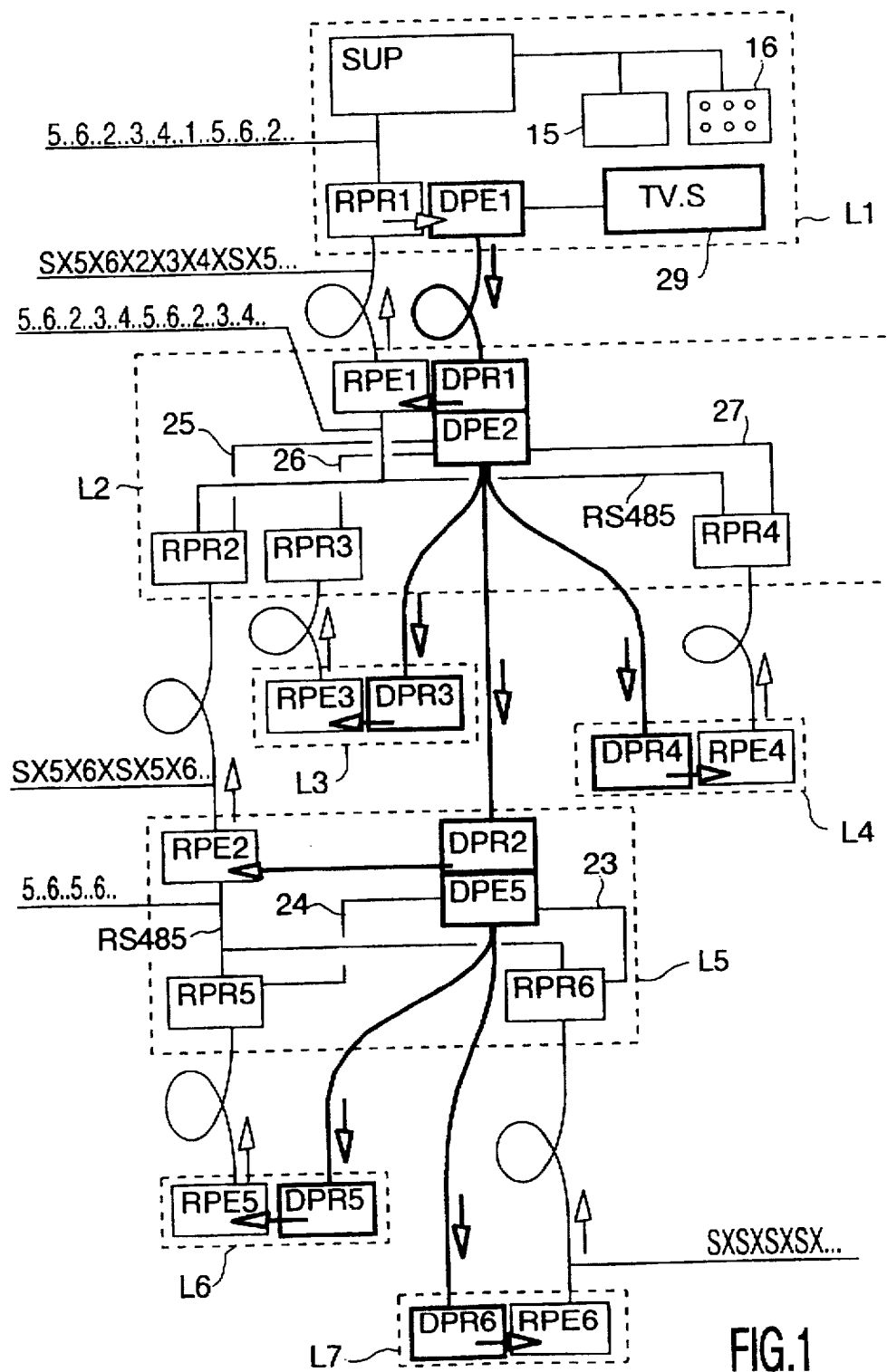
FIG. 1 diagrammatically shows a network according to the invention.

The network shown by way of example in FIG. 1 has two parallel tree-like paths, one main tree-like path called "downstream channel" or "downstream path", and a tree-like path for upstream information signals called "upstream channel" or "upstream path".

A supervisor SUP ensures the management of the whole network. It is formed, for example, by a computer of the PC type with its habitual peripherals (not shown) such as a printer and a monitor, and comprises a link by serial bus to external elements 15, 16 which are, for example, a bank of indicator lights 16 for alarm and/or information.

The main path ("downstream") starts from a television signal source 29 which is connected to a downstream channel transmitter DPE1 in which a laser produces light signals which are led by an optical fibre to a downstream channel receiver DPR1. This receiver DPR1 converts the light signals coming from the transmission centre into electric signals, which are reconverted into light signals by a downstream channel transmitter DPE2. This transmitter feeds three optical fibres connected to three downstream channel receivers DPR2, DPR3, DPR4, respectively. The receivers DPR3 and DPR4 are end-of-branch receivers. On the other hand, the receiver DPR2 converts the light signals coming from the transmitter DPE2 into electric signals, which are reconverted into light signals by a downstream channel transmitter DPE5. This transmitter feeds two optical fibres connected to a downstream channel receiver DPR5 and to a downstream channel receiver DPR6 respectively, which are end-of-branch receivers.

The upstream path arrives at the supervisor SUP via an upstream channel receiver RPR1 fed by an optical fibre which comes from an upstream channel transmitter RPE1. This transmitter RPE1 receives electric signals which are brought there by a bus, here of the type RS485, from three upstream channel receivers RPR2, RPR3, RPR4 and converts them into light signals. Each of the three receivers RPR2, RPR3, RPR4 converts a light signal it receives from the transmitters RPE2, RPE3, RPE4 respectively, into an electric signal it applies to the bus RS485 when the transmitter RPE1 so requests.

The transmitters RPE3 and RPE4 are end-of-branch transmitters. On the other hand, the transmitter RPE2 is connected by a bus of the type RS485 to two upstream channel receivers RPR5, RPR6. Each of these two receivers is connected by an optical fibre to an upstream channel transmitter RPE5, RPE6 respectively, which are end-of-branch transmitters. A vertical arrow indicates the direction of data transmission for each optical fibre. The supervisor as well as the transmitter DPE1 and the receiver RPR1 are situated in the same group L1 which is the centre of transmission and the centre of the network management. The receivers DPR1, RPR2, RPR3, RPR4 and the transmitters RPE1, DPE2 are situated all together in another group L2, remote from group L1. Such a group is a junction which forms an electro-optical relay in which a light signal in an optical fibre is converted into an electric signal, its information contents are completed, as required, after which the signal is again converted into a light signal. A junction is a common junction for the two paths. Junction L2 is situated between an upstream branch which comes from the management centre L1 and also three downstream branches which here lead to another junction L5, and to groups L3 and L4 respectively, which are each at the end of a branch.

The receivers DPR2, RPR5 and RPR6 and the transmitters RPE2, DPE5 are located in the other junction L5 which forms an electro-optical relay for each of the paths between an upstream branch which comes from the centre L2 and two downstream branches which lead to a group L6 and a group L7 respectively, which are each the end of a branch. In the groups L3, L4, L6, L7 are situated, respectively, the end elements RPE3 and DPR3, RPE4 and DPR4, RPE5 and DPR5, RPE6 and DPR6.

Each respective branch of the upstream channel runs parallel with a branch of the downstream channel, that is, the point of departure of the one is the point of arrival of the other, and vice versa.

The upstream channel has for its object, among other things, to cause information messages and management messages which contain indications about the state of the network, for example, local automatic gain control rates, power supplies received in the fibres, data relating to power supplies, temperature etc. to go upstream to the supervisor. In each of the groups are provided means for measuring state variables and for detecting faults, a signal absence, the stop of a fan etc. A downstream channel receiver, for example, if it detects a signal absence, transmits a local information message to the upstream channel transmitter which is situated in the same group. For example, the downstream channel receiver DPR1 transmits a message to the upstream channel transmitter RPE1. Such a message is symbolized each time by a horizontal arrow in the Figure. A message coming from DPR6, for example, reaches the supervisor via RPE6, RPR6, RPE2, RPR2, RPE1, RPR1. The supervisor can then activate, for example, an alarm and/or print a note intended to inform a troubleshooter.

There is also provided a link between an upstream channel receiver, for example, RPR2, and the corresponding downstream channel transmitter, for example, DPE2, to perform certain operations locally. For example, if a fibre fracture is detected between DPE2 and DPR2, it would be dangerous for the laser of DPE2 to continue to transmit, in the case where a technician would be present at the location of the fracture. Thus, DPR2 gives the information to RPE2, which information is supplied to RPR2 and the instruction to stop the laser of DPE2 is dealt with locally via connection 25 between RPR2 and DPE2. Periodic attempts to start again will thus be made at regular intervals. Such links for local handling are symbolized by the various connections 23 to 27 in the Figure. In addition to the local handling, there must be sent to the supervisor the information concerning the fault: this is obtained by another type of message which will be described below under the name of "S", which is created in a transmitter, for example, RPE2.

The data rate is much lower in the upstream channel than in the downstream channel, the optical fibres are there thus of an even smaller section than those of the downstream channel, and the light sources in the upstream channel are light-emitting diodes, whereas in the downstream channel they are lasers, which are much more expensive. Therefore, an optical divider is used for sending light in various fibres from a single laser, for example, in DPE2 or DPE5.

Figure 2:
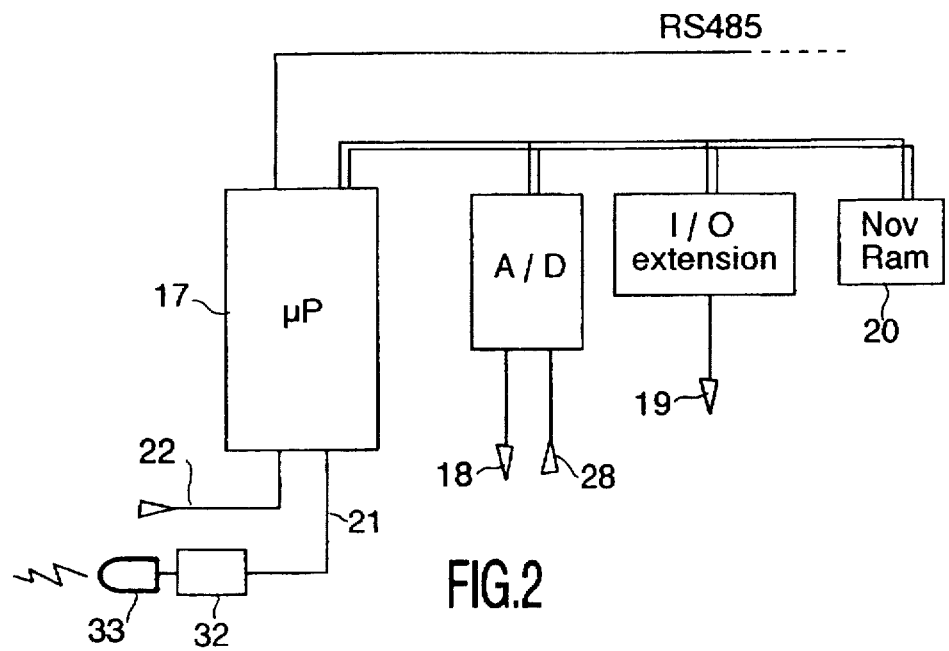
FIG. 2 diagrammatically shows a microprocessor system in a receiver or in a transmitter of the upstream path.

An upstream channel receiver comprises a processor ensemble diagrammatically shown in FIG. 2, based on a microprocessor 17, for example, of the type 8052. This processor comprises an internal RAM memory of 256 bits and it is not desirable to add thereto an additional storage unit. It is thus necessary for the system to operate without requiring more storage capacity. This processor is connected to:

- a serial data line 21, coming from an optical/electrical converter 32-33 which receives the light from an optical fibre,
- a serial data line 22, from which it receives management signals and information signals,
- bus RS485, by which it communicates with the associated transmitter and on which it can also receive management signals,
- an 12C bus connected to local components among which there are, for example:
- an analog/digital converter (A/D) intended, for example, for supplying on an analog output 18, for the purpose of display, values which are interesting to the maintenance staff such as, a light power value or a gain control value,
- an input/output function (I/O) with an output 19 connected to signalling devices such as alarm control relays or indicator lights, or to a security relay which commands the laser of the main channel transmitter to stop,
- a memory 20 for storing important events.

Functions of the software of the processor are, for example, receiving, recording and transmitting to the transmitter the information signals received by the receiver, making immediate decisions in the case of a fault of the laser or of a fibre, transmitting any information when necessary and recording important events.

A transmitter of the upstream channel also comprises a microprocessor with an environment which is essentially identical with that illustrated in FIG. 2 for a receiver, but in which certain peripherals have different roles. It has an input 28 for receiving various signals which an analog/digital converter converts into digital signals. The serial data line thus leads to a modulator 32 and to the light-emitting diode 33 which transmits light into an optical fibre.

The communication is possible in either direction between a transmitter, for example, RPE1, and receivers, for example, RPR2, RPR3, RPR4, by the bus RS485, and an upstream channel transmitter RPE acts as a supervisor for the receivers RPR of the same group. For example, RPE1 acts as a supervisor with respect to RPR2, RPR3, RPR4. These three receivers of the upstream channel are polled in turn by the upstream channel transmitter RPE1 on bus RS485. The same holds for RPE2 with respect to RPR5 and RPR6. Each of the buses RS485 may further be connected to an external element which communicates with the network, for example, with a "domotic" network which is present in the same group, or with a caretaker's lodge or a maintenance service, etc.

On the other hand, a transmitter on the upstream channel has no means for verifying whether it has correctly received all the management messages that come from downstream and have this transmitter for their destination, and, furthermore, various transmitters of the upstream channel may send a message at the same time: for example, RPE5 and RPE6 may together send messages to junction L5. It is not possible to acknowledge receipt on the part of a receiver RPR for a message from a transmitter RPE. Since the buffer memory in which an upstream channel receiver writes the messages received from the optical fibre is small and can only contain one message, any message received from downstream is to be transferred as soon as possible to the upstream part so as to empty the memory. But for transferring a message, a receiver of the upstream channel is to be polled by the transmitter of the upstream channel to which it is connected by bus RS485. This transmitter may be engaged in a long task and may not perform any polling for a moment. Thus, while it is waiting for the transmitter of the upstream channel, the receiver of the upstream channel cannot receive another message from downstream, because it has not been able to empty its memory. And during this period of time other messages arrive along the fibre. It is for dealing with this problem that a particular process has been conceived for information signals not getting lost.

A transmitter RPE retransmits all the messages which arrive from downstream, and adds local messages thereto. This plurality of messages forms a "sequence" of messages. Each message contains a recognition code which indicates its origin. A message will be designated in the present description by the number that represents its origin, for example, "5" designates a message initially sent by RPR5, "3" designates a message initially sent by RPR3, etc.

A sequence of messages further includes a synchronization message which has a constant length and will be designated "S", which permits the receivers of synchronizing their clocks and thus of comprising the message sequence. Furthermore, this message has two purposes: in addition to the synchronization as such, it contains information signals coming from a group and from its downstream channel receiver. For example, a message "S" transmitted by RPE2 contains information signals relating to group L5, produced notably by the receiver DPR2 of the main path.

A message sequence also comprises messages called security messages, for local use, that is to say, intended only for the junction situated immediately upstream, and which will not be transmitted to the centre. They also have a constant length and will be designated as "X". They too contain information signals relating to group L5, produced notably by the receiver DPR2 of the main path. In practice, a message "X" has a same contents as a message "S". A message "X" contains, for example, a code which signifies "all goes well", or, on the other hand, "stop the laser"; if a corresponding action is necessary, it is carried out at the spot the moment the message "X" is received. For example, a message "X" received by RPR2 is processed and executed at RPR2/DPE2.

For accelerating the transmission of a local use security message, such a message is inserted systematically each time between two messages coming from downstream, and retransmitted by a transmitter.

Each message received from downstream and retransmitted is thus followed by a message "X", and each sequence of messages thus comprises the messages coming from downstream which alternate with messages "X" (the same message "X" being repeated as many times as this is necessary), which are all followed by the actual message "S" of the transmitter of the upstream channel. As "X" and "S" have a constant length, a receiver is capable of distinguishing all the messages from each other.

A transmitter of the upstream channel, for example, RPE2, transmits without stopping, that is to say, the process of creating the sequence of messages is repeated indefinitely, while the messages are being updated, as required, between two repetitions.

The structure of the message sequences will become clearer from the following non-limiting examples:

the transmitter of the upstream channel RPE6 transmits a sequence "S X S X S X S X . . . ", formed by the message "S" which contains the information coming from DPR6, with a message "X" inserted each time between two messages "S". The message "S" coming from RPE5 is renamed "5" by RPR5, and the message "S" coming from RPE6 is renamed "6" by RPR6, and they are supplied by bus RS485 to the transmitter RPE2, the transmitter of the upstream channel RPE2 sends along the optical fibre a sequence "S X 5 X 6 X S X 5 X 6 X S . . . ", in which sequence there is always a message "X" between two messages, and, when disregarding messages "X", a message "S" after each series of "5, 6". The reception of message "S" indicates that the other messages "5" and "6" have been sent before, the transmitter of the upstream channel RPE1 sends along the optical fibre a sequence "S X 5 X 6 X 2 X 3 X 4 X S . . . ", in which:

"5", "6", "2" represent the messages "5", "6", "S" , received via RPR2, "S" being renamed "2", "3" represents a message "S" received from DPR3 via RPR3 and renamed "3", "4" represents a message "S" received from DPR4 via RPR4 and renamed "4", and "S" is the actual message from DPR1.

There is always a message "X" between two messages, and a message "S" after "5", "6", "2", "3", "4".

By a bus RS485, a transmitter, for example, RPE1, polls the receivers, for example, RPR2, RPR3, RPR4 to request for a message in response. The arrangement of the data on the bus RS485 is ordinary and any known arbitrary procedure can be used. In the group L2, for example, a message 5 coming from the receiver RPR2 is found on the bus RS485 in response to a polling from RPE1 which addresses RPR2, then a message 6 in the course of a next polling, after which comes a message 2. When RPE1 has received the message 2, it knows that the sequence produced by RPR2 is complete, and it polls RPR3 and receives a message 3 therefrom. When RPE1 has received the message 3, it knows that the sequence coming from by RPR3 is complete and it polls RPR4 and receives the message 4 therefrom. The software is simple, it comprises, in essence, a test "Is the recognition number of the received message the one from the polled receiver?"; if this is the case, another receiver is polled, if this is not the case, the same receiver is polled again. Worded differently, for example, the processor tests whether the last message supplied in a given group L2 to the transmitter RPE1 in response to the periodic polling performed by the latter, is the "S" that has been inserted into the sequence by the transmitter RPE2 of a group immediately downstream of L5, after which this transmitter RPE2 of a group immediately downstream has repeated all the messages coming from the receivers RPR5, RPR6 of this immediately downstream group and which has subsequently been named 2 when applied by RPR2 to RPE1, and if this is the case, another receiver RPR3 of the same group L2 is polled, if not, the same receiver RPR2 is polled again.

To carry out this test, the processor of a transmitter is thus programmed while taking account of the recognition codes of the messages generated by the receivers with which it communicates by bus RS485, for example, the processor of the transmitter RPE1 has the codes of the messages 2, 3, and 4 in a permanent memory. A transmitter does not have more memory capacity than a receiver and it retransmits a message the moment it has received the message by the bus. After each message that has been retransmitted from the bus to the optical fibre, the transmitter transmits the message "X". When all the receivers have been polled and their messages have been retransmitted in turn with a message "X" inserted each time between two messages, the transmitter transmits the local message "S". A transmitter receives only one message per polling, so there is a dead time between each pair of messages, indicated each time by two points in the Figure.

Figure 3:
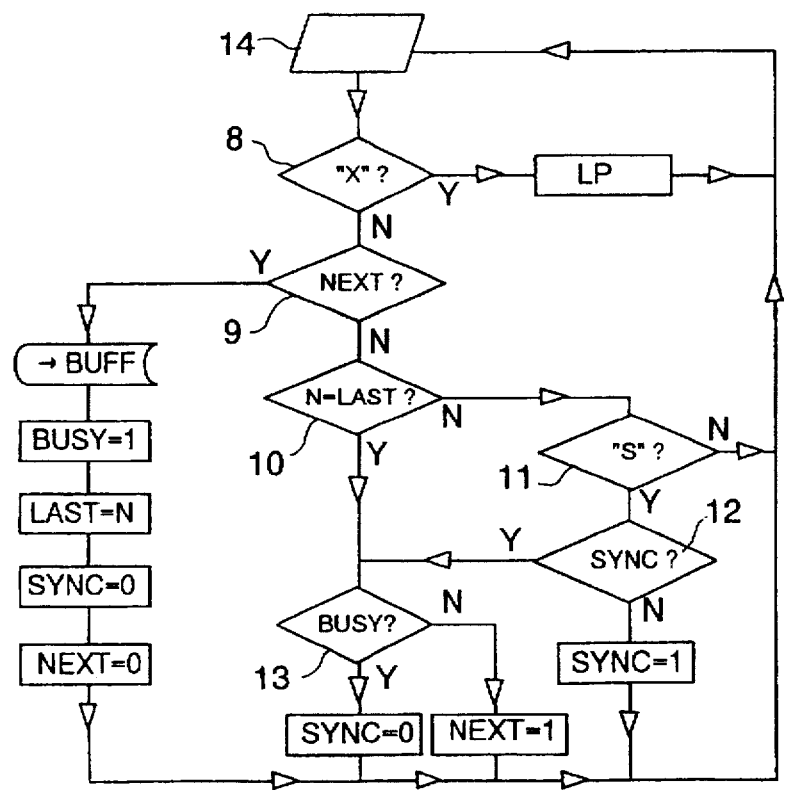
FIG. 3 is a diagram showing the process implemented in a receiver of the upstream path.

The process realized by software in a receiver RPR and resulting in the above message sequences used as an example is illustrated by the diagram of FIG. 3. In this process the following variables are used:

BUSY is a flag indicating that the buffer memory is occupied,

SYNC is a flag indicating that a synchronization and local information message "S" has been received well, NEXT is a flag indicating that the next message can be recorded, LAST is a variable storing the number of a message, N is the number of the message that has just been received and is being processed, A flag of a 1 value will be called "raised", a flag that has a "zero" value will be called "lowered".

At the top of the diagram, 14 represents the reading and identification of an arriving message. Reference 8 represents a logic "X"? test, that is, "is the particular message a security message, or a local message of type "X"?, if the response to test 8 is yes (Y), the message is processed immediately in a block LP. As this is a message for local use, it is not transmitted up the upstream channel, thus after processing, the process returns to 14 with the reading of the messages that arrive.

if the response to test 8 is no (N), a test 9 NEXT? is carried out: "is the flag NEXT raised, that is, must the next message be recorded?", if the response to test 9 is yes (Y), a series of processes will be carried out in the blocks →BUFF, BUSY=1, LAST=N, SYNC=N, NEXT=0 after which the process returns to 14 for the reading of messages that arrive. In the block →BUFF, the message is recorded in a buffer memory where it is available for transmission on the bus RS485 in response to a polling. In the block BUSY=1, the flag BUSY is raised, which means that the memory of the receiver is occupied. In the block LAST=N, the variable LAST adopts the number of the received message. In the block SYNC=0, the flag SYNC is lowered. In the block NEXT=0, the flag NEXT is lowered, which means that a priori the next message that will be received is not the message one wishes to record.

if the response to test 9 is no (N), a test 10 N=LAST? is carried out: "does the current message carry the number LAST?", if the response to test 10 is yes (Y), a test 13 BUSY? is carried out: "is the buffer memory occupied?". If the response is yes (Y), the flag SYNC is lowered, after which the process returns to 14, to the reading of messages that arrive, and if the response is no (N), the flag NEXT is raised after which the process returns to 14 to the reading of messages that arrive.

if the response to test 10 is no (N), a test 11 "S"? is carried out: "is the message a message of type S?", if the response to the test 11 is no (N), the process immediately returns to the reading of the messages that arrive.

if the response to test 11 is yes (Y), a test which verifies whether the flag SYNC is raised is carried out in block 12.

if the response to the test 12 is no (N), the flag SYNC is raised, after which the process returns to 14, to the reading of messages that arrive.

if the response to test 12 is yes (Y), the process proceeds to test 13.

In this diagram there is no step for lowering the flag BUSY. This flag is lowered at the end of each interruption of the process by a polling from the side of the transmitter.

One may easily understand that this set of operations leads to the procedure described above. For example, in a message sequence received by RPR1, as illustrated earlier (S X 5 X S X 2 X 3 X 4 X S) after the local message and the synchronization message "S" which one is supposed to have conveyed by the tests 8, 9, 10, 11, 12 and to have raised the flag SYNC, the message "X " is processed locally, so message 5 arrives. Supposing that the flag NEXT is raised, the test "NEXT"? gets a positive response. The message is recorded (operation →BUFF), the flag BUSY is raised, the number 5 is stored (LAST=5), the flags SYNC and NEXT are lowered, after which the process returns to 14 and the message 6 that follows is read. It cannot be recorded, because NEXT is lowered (test 9), there is no number 5 any more which has been stored for LAST, and thus the process arrives at test 11 which returns to the reading of the next message. The message 6 is thus simply neglected. The same will hold for the next messages which will all follow the same route, because they do not have number 5 and because NEXT is still lowered. When message "S" arrives, it passes through 8, 9, 10, 11 and 12 and raises the flag SYNC. When the message 5 arrives again, NEXT is still lowered, but N=5=LAST and test 13 is directly proceeded to. As the memory is still occupied (BUSY is raised), SYNC is reset to zero and the message 5 is also neglected. Let us now assume that the polling on the side of the supervisor takes place at this moment: message 5 which dwells in the buffer memory, is transmitted by the bus RS485 and the flag BUSY is lowered: now the memory of RPRI is no longer occupied. None the less, RPR1 has not accounted for the order of the course of the messages which have arrived at the fibre, because it does not know whether the message that will arrive is exactly the message that is to be transmitted after the one that has just been transmitted. In case of doubt, it will thus neglect this message, because NEXT is still lowered. The message 6 which, however, could be received well, is thus neglected, and so are the messages 2, 3, 4, "S". The message S arrives again, because each sequence is retransmitted incessantly. The test 10 has a positive response, the test 13 a negative response, and thus the flag NEXT is raised. Then RPR1 recognizes that it has already received and retransmitted a message 5, it thus goes back to the state for receiving the next message. Message 6 is recorded (operation →BUFF), the flag BUSY is raised, number 6 is stored (LAST=6), the flags SYNC and NEXT are lowered, after which the process goes back to 14 and the process is carried on in the same fashion, which finally leads to the recording and to the retransmission of all the messages in the order of 5 . . . 6 . . . 2 . . . 3 . . . 4 . . .

The branch comprising the test 11, 12, to the right of FIG. 3, is used for verifying the occurrences of the signal "S", to detect any faults in the timing with which the messages "S" arrive.

The procedures described above relate to the data stream via the transmitters of the upstream channel and the receivers of the downstream channel. The television signals going downstream by the main downstream path are processed in known manner and do not form part of the invention.

I claim:

1. Process for transmitting upstream messages in a cable television network which comprises a specific tree-like path for sending messages upstream, which path comprises a plurality of branches called upstream branches, each formed by an optical fibre, which process is characterized in that, in a junction between an upstream branch and various downstream branches, which comprises a transmitter including a converter for producing a light signal transmitted up the upstream branch from a message sequence in the form of an electric signal and, for each downstream branch, a receiver which includes a converter which produces a message in the form of an electric signal from a light signal coming from the downstream branch, a message received from downstream and carrying a recognition code is recorded in a receiving memory, based on messages received by the receivers and a message, called local message, generated in the junction itself to be transmitted up the upstream branch, a send message sequence is determined which comprises first messages which repeat in a delayed version the messages received by the receivers and, in the end, the local message whose presence indicates that the sequence has ended, the same sequence is repeated indefinitely while the contents of the message are being updated, as required.

2. Process as claimed in claim 1, characterized in that the receiving memories are polled periodically and a message received from downstream is recorded in the receiving memory only if the message recorded previously has been read by the transmitter.

3. Process as claimed in claim 2, characterized in that, after a certain message has been applied to the transmitter in response to a polling, and while other messages continue to arrive at the receiver in a repetitive way, with said certain message among them, said certain message is waited for to occur again without any recording being effected, and the message following said certain message is then recorded.

4. Process as claimed in claim 2, characterized in that a test is made whether the latest message received in response to the periodic polling of a receiver is a local message coming from the downstream junction, and in that case, a periodic polling of another receiver is proceeded to, in the opposite case, the same receiver is continued to be polled.

5. Process as claimed in claim 1, characterized in that a message exclusively meant for the junction situated immediately upstream is inserted between each of the other messages.

6. Cable television network comprising a tree-like path called main path which the signals follow when they leave a transmission centre, and which comprises a plurality of branches called downstream branches, each formed by an optical fibre, and a second tree-like path called upstream path which signals follow to go back to the transmission centre, and which comprises a plurality of branches called upstream branches which are each formed by an optical fibre and run parallel with a branch of the main path, characterized in that where the network comprises at least a junction between an upstream branch and various downstream branches, such a junction comprises a receiver for each downstream branch, which includes a converter for generating a message in the form of an electric signal from a light signal coming from the downstream branch, and a processor having instructions to instruct the recording of this message together with a recognition code in a receiving memory, a transmitter, which includes a processor with instructions to determine a sequence of send messages based on digital data which represent, on the one hand, messages received by the receivers and, on the other hand, a message called local message generated in the junction itself to be transmitted up the upstream branch, which sequence comprises firstly, messages which repeat in a delayed version the messages received by the receivers, and finally, the local message whose presence indicates that the sequence has ended, and to instruct the indefinite repetition of the same sequence while the contents of the message are being updated, as required, and a converter for producing a light signal based upon the sequence of messages and transmitted up the upstream branch.

7. Cable television network as claimed in claim 6, characterized in that instructions of the processor of the transmitter instruct a periodic polling procedure of the receiving memories, and instructions of the processor of the receiver permit of the recording in the receiving memory of a message received from downstream, only if the message recorded previously has been read by the transmitter.

8. Cable television network as claimed in claim 7, characterized in that after a certain message has been applied to the transmitter in response to a polling, and while other messages continue to arrive at the receiver in a repetitive way, with said certain message among them, instructions from the processor of the receiver instruct to wait for said certain message to occur again without any recording being effected, and to record the message following said certain message.

9. Cable television network as claimed in claim 7, characterized in that the instructions of the processor of the transmitter instruct the testing whether the latest message received in response to the periodic polling of a receiver is a local message coming from the downstream junction, and in that case, to proceed to a periodic polling of another receiver, in the opposite case, to continue polling the same receiver.

10. Cable television network as claimed in claim 6, characterized in that instructions of the processor of the transmitter instruct the insertion of a message exclusively meant for the junction situated immediately upstream, between each of the other messages.

11. Intermediate station called "junction", intended to be used in a tree-like cable television network, between an upstream branch formed by an optical fibre that transmits signals coming from a transmission centre, and various downstream branches formed each by an optical fibre that transmits signals to the transmission centre, characterized in that it comprises a receiver for each downstream branch, which includes a converter for generating a message in the form of an electric signal from a light signal coming from the downstream branch, and a processor having instructions to instruct the recording of this message together with a recognition code in a receiving memory, a transmitter, which includes a processor with instructions to determine a sequence of send messages based on digital data which represent, on the one hand, messages received by the receivers and, on the other hand, a message called local message generated in the junction itself to be transmitted up the upstream branch, which sequence comprises firstly, messages which repeat in a delayed version the messages received by the receivers, and finally, the local message whose presence indicates that the sequence has ended, and to instruct the indefinite repetition of the same sequence while the contents of the message are being updated, as required, and a converter for producing a light signal based upon the sequence of messages and transmitted up the upstream branch.

12. Intermediate station as claimed in claim 11, characterized in that instructions of the processor of the transmitter instruct a periodic polling procedure of the receiving memories, and instructions of the processor of the receiver permit of the recording of a message received from downstream in the receiving memory, only if the message recorded previously has been read by the transmitter.

13. Intermediate station as claimed in claim 12, characterized in that, after a certain message has been applied to the transmitter in response to a polling, and while other messages continue to arrive at the receiver in a repetitive way, with said certain message among them, said certain message is waited for to occur again without any recording being effected, and the message following said certain message is then recorded.

14. Intermediate station as claimed in claim 12, characterized in that instructions of the processor of the transmitter instruct to test whether the latest message received in response to the periodic polling of a receiver is a local message coming from the downstream junction, and in that case, to proceed to a periodic polling of another receiver, in the opposite case, to continue to poll the same receiver.

15. Intermediate station as claimed in claim 11, characterized in that instructions of the processor of the transmitter instruct the insertion of a message exclusively meant for the junction situated immediately upstream between each of the other messages.

* * * * *